(12) United States Patent
Kode et al.

(10) Patent No.: US 10,635,793 B2
(45) Date of Patent: *Apr. 28, 2020

(54) RESTRICTED ACCOUNTS ON A MOBILE PLATFORM

(71) Applicant: GOOGLE LLC, Mountain View, CA (US)

(72) Inventors: Ushasree Kode, Fremont, CA (US); Carlos Valdivia, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,953

(22) Filed: Sep. 1, 2017

(65) Prior Publication Data
US 2017/0364669 A1    Dec. 21, 2017

Related U.S. Application Data

(63) Continuation of application No. 14/283,793, filed on May 21, 2014, now Pat. No. 9,754,091.

(51) Int. Cl.
*G06F 21/31*    (2013.01)
*H04L 29/06*    (2006.01)

(52) U.S. Cl.
CPC .............. *G06F 21/31* (2013.01); *H04L 63/08* (2013.01); *H04L 63/102* (2013.01)

(58) Field of Classification Search
CPC ........ G06F 21/31; H04L 63/08; H04L 63/102
See application file for complete search history.

(56) References Cited

U.S. PATENT DOCUMENTS

| 856,086 A | 6/1907 | McVoy |
| 6,418,466 B1 | 7/2002 | Bertram et al. |

(Continued)

OTHER PUBLICATIONS

Anonymous: "AWS Security Token Service Using Temporary Security Credentials", Amazon Web Services, Jun. 15, 2011 (Jun. 15, 2011), XP055206899, Retrieved from the Internet: URL:http://docs.aws.amazon.com/STS/latest/UsingSTS/stsug.pdf [retrieved on Aug. 7, 2015].

(Continued)

*Primary Examiner* — Cheng-Feng Huang
(74) *Attorney, Agent, or Firm* — McDonnell Boehnen Hulbert and Berghoff LLP

(57) ABSTRACT

Systems and techniques are provided for restricted accounts on a mobile platform. A request to create a restricted account may be received. The restricted account may be a user account with a restriction. Credentials for the restricted account may be received. A restriction for the restricted account may be received. The restriction may include an access restriction or a lifetime restriction. An access restriction may prevent an application from accessing the restricted account and a lifetime restriction may limit the lifetime of the restricted account. The restricted account may be stored with the credentials and the restriction. A request may be received for a list of user accounts from an application. The restricted account may be determined to include an access restriction that prevents the application from accessing the restricted account. The list of user accounts may be sent to the application and without an identifier for the restricted account.

20 Claims, 4 Drawing Sheets

(56) References Cited

U.S. PATENT DOCUMENTS

| | | | |
|---|---|---|---|
| 8,190,588 B1 | 5/2012 | Gupta et al. | |
| 8,239,918 B1 | 8/2012 | Cohen | |
| 8,388,440 B2 | 3/2013 | Patterson | |
| 8,560,861 B1 | 10/2013 | Dharmarajan et al. | |
| 8,627,068 B1 | 1/2014 | Miller et al. | |
| 8,806,593 B1 | 8/2014 | Raphel | |
| 2004/0064708 A1* | 4/2004 | Angelo | G06F 21/34 713/185 |
| 2004/0128508 A1 | 7/2004 | Wheeler et al. | |
| 2009/0144183 A1 | 6/2009 | Gatchell et al. | |
| 2009/0249076 A1* | 10/2009 | Reed | G06Q 30/00 713/181 |
| 2011/0218892 A1* | 9/2011 | Jeong | G06Q 40/12 705/30 |
| 2013/0055377 A1 | 2/2013 | Chen et al. | |
| 2013/0084828 A1* | 4/2013 | Forte | H04L 63/083 455/410 |
| 2013/0088650 A1 | 4/2013 | Rouady et al. | |
| 2013/0198382 A1* | 8/2013 | Wang | H04L 65/1069 709/225 |
| 2013/0219517 A1* | 8/2013 | Yerli | H04L 63/10 726/28 |
| 2014/0032691 A1 | 1/2014 | Barton | |
| 2014/0068721 A1* | 3/2014 | Ong | H04L 63/107 726/4 |
| 2014/0164125 A1 | 6/2014 | Taylor | |
| 2014/0344890 A1* | 11/2014 | Warrick | H04L 61/1511 726/1 |
| 2015/0067327 A1* | 3/2015 | Lipton | H04L 63/083 713/168 |
| 2015/0149358 A1* | 5/2015 | Robbin | G06Q 20/40 705/44 |
| 2015/0149766 A1* | 5/2015 | Shukla | H04L 9/3247 713/155 |
| 2015/0215241 A1 | 7/2015 | Zhou | |

OTHER PUBLICATIONS

Anonymous: "Configuring Windows 7 for a Limited User Account", technet.microsoft.com, Oct. 7, 2009 (Oct. 7, 2009), XP055206896, Retrieved from the Internet: URL:https://technet.microsoft.com/en-us/library/ee623984v=ws.10).aspx [retrieved on Aug. 7, 2015] pp. 1-7.

Anonymous: "Google AdWords Account Access Management Guide", Jul. 5, 2012 (Jul. 5, 2012), XP055207225, Retrieved from the Internet: URL:http://www.wordstream.com/blog/ws/2012/07/05/googleadwords-account-access [retrieved on Aug. 11, 2015].

Anonymous: "OpenDNS", Wikipedia, Apr. 19, 2014 (Apr. 19, 2014), XP055206881, Retrieved from the Internet: URL https://en.wikipedia.org/w/index.php?title=OpenDNS&oldid=604866791 [retrieved on Aug. 7, 2015] the whole document.

International Preliminary Report on Patentability dated Nov. 22, 2016 as received in Application No. PCT/US2015/031587.

International Search Report and Written Opinion dated Aug. 19, 2015 as received in Application No. PCT/US2015/031587.

* cited by examiner

RESTRICTED ACCOUNTS ON A MOBILE PLATFORM

BACKGROUND

Mobile computing devices, such as, for example, smartphones and tablets, may include, as part of a mobile platform used by the mobile computing device, a component, which may be part of the operating system, capable of managing user accounts on the mobile computing device. For example, a user may have an account in an umbrella ecosystem. The umbrella ecosystem may include an application ecosystem from which the user can download, install, and manage application on the mobile computing device, and other services, such as email, cloud storage, maps and navigation, and web search. The user's account in the umbrella ecosystem, or umbrella account, may include credentials such as a username and password that can be used to access the user's data in the umbrella ecosystem. The application ecosystem and other services may each be accessed from the mobile computing device using an associated application. For example, an application store application may be used to access the application ecosystem, and an email application may be used to access the user's email account in the umbrella ecosystem. Because the application ecosystem and other services are part of the same umbrella ecosystem, they may all obtain proper credentials to access the user's data from the umbrella account stored on the mobile computing device.

The user accounts managed by the component of the mobile platform, for example, the operating system or a separately installed application, of the mobile computing device may be available device-wide. Every application installed on the mobile computing device may have access to any user account stored on the mobile computing device and managed by the component of the mobile platform. For example, when a first user logs-in to their umbrella account on a second user's mobile computing device, the applications installed on the second user's mobile computing device may gain access to the first user's data in the umbrella ecosystem. The email application on the second user's computing device may access the first user's email from the umbrella ecosystem's servers, and may mix the email with the second user's email.

Some applications may establish their own user accounts on the mobile computing device. These third-party user accounts may not be managed by the component of the mobile platform, and may not be available to any other applications on the mobile computing device. For example, an application may store user account credentials, such as a user name and password or token, with the application's data instead of with the user accounts that are managed by the operating system. Third-party user accounts may be less secure than user accounts managed by a component of the mobile platform, and may be difficult to share among applications.

BRIEF SUMMARY

According to an embodiment of the disclosed subject matter, a request to create a restricted account may be received. The restricted account may be a user account with at least one restriction. Credentials for the restricted account may be received. A restriction for the restricted account may be received. The restriction may include an access restriction or a lifetime restriction. An access restriction may prevent an application from accessing the restricted account and a lifetime restriction may limit the lifetime of the restricted account. The restricted account may be stored with the credentials and the restriction.

A request may be received for a list of user accounts from an application. The restricted account may be determined to include an access restriction that prevents the requesting application from accessing the restricted account. The list of user accounts may be sent to the application. The list of user accounts may omit an identifier for the restricted account.

The restricted account may be determined to include a lifetime restriction and the lifetime restriction may include a time limit on the lifetime of the restricted account. The age of the restricted account may be determined. The age of the restricted account may be compared to the time limit on the lifetime of the restricted account. The restricted account may be deleted when the age of the restricted account is equal to or greater than the time limit on the lifetime of the restricted account.

The restricted account may be determined to include a lifetime restriction and the lifetime restriction may include an indication of an event whose occurrence ends the lifetime of the restricted account. It may be determined that the event in the lifetime restriction has occurred. The restricted account may be deleted.

A request may be received for a list of user accounts from an application. It may be determined that the restricted account includes an access restriction that does not prevent the requesting application from accessing the restricted account. The application may be sent the list of user accounts. The list of user accounts may include an identifier for the restricted account.

The restricted account may include an account in an umbrella ecosystem. A first application may be allowed access to the restricted account based on the restriction on the restricted account. The restriction may include an access restriction. The first application is associated with a first service of the umbrella ecosystem. A second application may be prevented from accessing the restricted account based on the restriction including the access restriction. The second application may be associated with a second service of the umbrella ecosystem The credentials may include a username and password, an email address and password, or a token. Storing the restricted account may include storing the restricted account in an account database. The account database may store a user account that is not restricted. The request to create the restricted account may be received from an application. The restriction may be received from the application. The restriction may be an access restriction. The access restriction may restrict access to the restricted account to only the application that requested the creation of the restricted account. The credentials and the restriction may be received using a network connection or a direct device-to-device connection. The request to create the restricted account may be received from an application based on user selection of a guest log-in for the application.

According to an embodiment of the disclosed subject matter, a means for receiving a request to create a restricted account, wherein the restricted account may be a user account with a restriction, a means for receiving credentials for the restricted account, a means for receiving a restriction for the restricted account, where the restriction may include an access restriction or a lifetime restriction, where an access restriction may prevent an application from accessing the restricted account and a lifetime restriction may limit the lifetime of the restricted account, a means for storing the restricted account with the credentials and the restriction, a means for receiving a request for a list of user accounts from an application, a means for determining that the restricted account includes an access restriction that prevents the requesting application from accessing the restricted account, a means for sending the application the list of user accounts, where the list of user accounts may omit an identifier for the restricted account, a means for determining the restricted account includes a lifetime restriction and the lifetime restriction includes a time limit on the lifetime of the restricted account, a means for determining an age of the restricted account, a means for comparing the age of the restricted account to the time limit on the lifetime of the restricted account, a means for deleting the restricted account when the age of the restricted account is equal to or greater than the time limit on the lifetime of the restricted account, a means for determining the restricted account comprises a lifetime restriction and the lifetime restriction comprises an indication of an event whose occurrence ends the lifetime of the restricted account, a means for determining that the event in the lifetime restriction has occurred, a means for deleting the restricted account, a mean for receiving a request for a list of user accounts from an application, a means for determining that the restricted account includes an access restriction that does not prevent the requesting application from accessing the restricted account, a means for sending the application the list of user accounts, where the list of user accounts may include an identifier for the restricted account, a means for receiving a request for the credentials of the restricted account from the application, a means for sending the credentials from the restricted account to the application, a means for allowing a first application access to the restricted account based on the restriction on the restricted account, where the restriction may include an access restriction and where the first application may be associated with a first service of the umbrella ecosystem, and a means for preventing a second application from accessing the restricted account based on the restriction comprising the access restriction, wherein the second application may be associated with a second service of the umbrella ecosystem are included.

Systems and techniques disclosed herein may allow for restricted accounts on a mobile platform. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
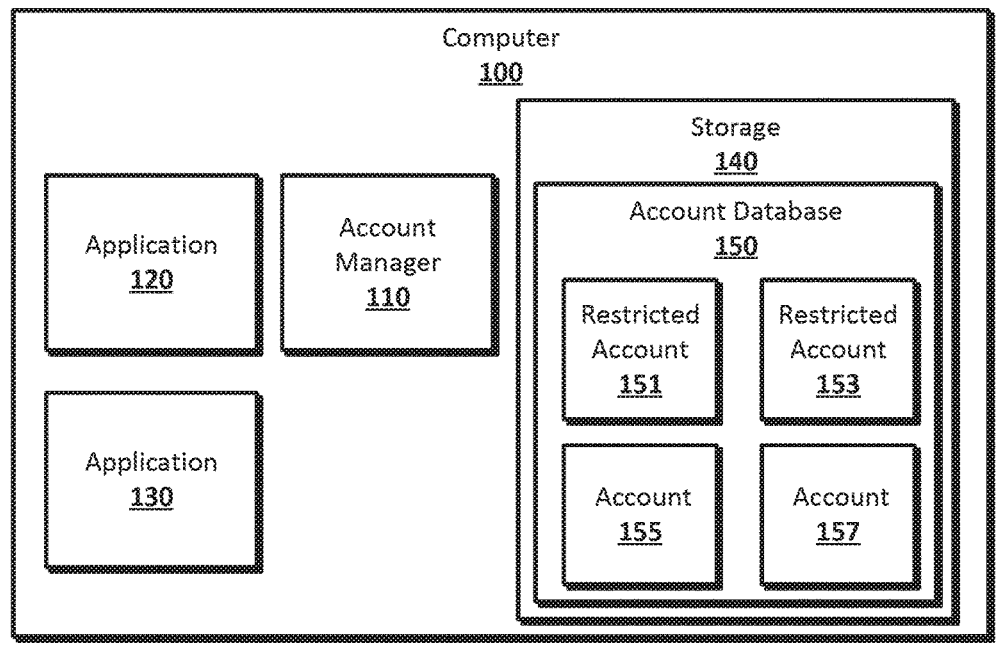
FIG. 1 shows an example system suitable for restricted accounts on a mobile platform according to an implementation of the disclosed subject matter.

Restricted accounts on a mobile platform may be user accounts on a computing device which may be managed by a component of a mobile platform and may include restrictions, including access restrictions and lifetime restrictions. The computing device may be a mobile computing device, such as a smartphone or tablet, which uses the mobile platform, or may be any other suitable computing device that uses the mobile platform, such as a smart television. Restricted accounts may be used, for example, to allow a user to use an umbrella account on a computing device with one specific application associated with an umbrella ecosystem while preventing other applications on the computing device associated with the application ecosystem from using the umbrella account. Restricted accounts may also be used to allow a first user to log-in on a computing device belonging to a second user and use an application requiring an umbrella account without causing all of the first user's umbrella account data to be synced with applications associated with the umbrella ecosystem on the second user's computing device. The first user's restricted account may also be deleted from the second user's computing device when the first user is done using the application, preventing the second user from using or accessing the first user's umbrella account. A single computing device may be shared among a number of users, who may all use restricted accounts on the computing device to keep each user's data segregated and prevent users from accessing other users' accounts and data.

The access restrictions for a restricted account may limit which applications on the computing device may access and use the restricted account, which may otherwise be available for use by all applications on the computing device. For example, a restricted account may include credentials for an umbrella account and restrictions limiting access to only an advertising management application associated with an umbrella ecosystem. An email application associated with the umbrella ecosystem may be unable to access the restricted account, and may not be able to use credentials for the umbrella ecosystem in the restricted account to access the user's email in the umbrella ecosystem. The advertising management application may be able to access and use the restricted account as if it were an unrestricted umbrella account. A restricted account may have any number of access restrictions. For example, a restricted account may be restricted to use with all applications except for one, or the restricted account may be limited to use with only one application. The access restrictions may be in the form of a whitelist or a blacklist, and may include not only applications currently installed on the same computing device as the restricted account, but any application that may be installed on the computing device, such as applications available through an application ecosystem. The access restrictions for a restricted account may be implemented using scopes in a token created for the restricted account.

The lifetime restrictions for a restricted account may limit how long the restricted account is stored on the computing device before being deleted. For example, a restricted account may include credentials for an umbrella account and a lifetime restriction causing the account to be deleted after a specified time period, on the completion of a specified action, or on the occurrence of an event. For example, the restricted account may include a lifetime restriction setting the lifetime of the restricted account to one hour from the creation of the restricted account, or a lifetime restriction setting the lifetime of the restricted account to end when the user logs out of the application used to create the account. The restricted account may function as an unrestricted umbrella account until the lifetime of the restricted account is reached, at which point the restricted account may be deleted or disabled. The restricted account may have more than one lifetime restriction. For example, the restricted account may have one lifetime restriction causing the lifetime of the restricted account to end when the application used to create the account is closed, and second lifetime restriction of four hours from creation of the restricted account. This may ensure eventual deletion or disablement of the restricted account if, for example, the user forgets to close or log out of the application. Restricted accounts may also include any combination of access and lifetime restrictions. For example, a restricted account may have access restrictions limiting the restricted to use with one application and a lifetime restriction causing the restricted account to be deleted when the application is closed.

Restricted accounts may be managed by the operating system of the computing device or by another component of the mobile platform used by the computing device. The computing device may store user accounts that are managed by the operating system in a database in the computing device's persistent storage. Restricted accounts created on the computing device may be stored in the same database as and managed similarly to user accounts that are not restricted. For example, the operating system of the computing device may include an account manager which may manage the creation, storage, editing, and deletion of, and access to, user accounts including restricted accounts. The account manager may be, for example, a component of the operating system accessible to applications through an Application Programming Interface (API). The account manager may also be a component of the mobile platform, such as an application installed separately from the operating system.

To create a user account, including restricted accounts, on the computing device, an application may access the account manager, which may receive data necessary for creation of the user account from the application and from user input, create the user account, and store the user account in an account database on the computing device. User input may be, for example, credentials such as a username and password for the user account. When an application creates a restricted account, the account manager may receive any restrictions, including access and lifetime restrictions for the restricted account from the application or from user input. The restrictions may be stored as part of the restricted account along with the credentials for the user account.

An application may invoke the creation of a restricted account based on a setting in the application or a choice made by the user. For example, an application may have a guest log-in function which may allow the user of the application to log-in with their own user account, such as an umbrella account. The guest log-in function may require the use of a restricted account. An application may present a user with the choice to create a restricted account for use with the application. An application may also require the creation and use of a restricted account to prevent other applications on a computing device from accessing the user account used with the application.

The application may run on a computing device shared by a number of users. When a user runs the application, the application may prompt the user to log-in using the guest log-in function. The user may enter the username and password for the user's umbrella account, which may be used by the account manager on the computing device to create a restricted account. The restricted account may include access restrictions limiting access to the restricted account to the application that initiated the creation of the restricted account and a lifetime restriction limiting the lifetime of the restricted account to the length of time the user spends using the application. The user may use the application, which may have access to any application-appropriate data for the user from the umbrella ecosystem, and exit or log-off of the application when finished. Upon detecting that the application has been exited or logged-off, the account manager may delete the restricted account that was created by and used with the application. This may prevent future users of the application on the shared computing device from having access to user accounts which are not their own, while still allowing future users to use the application on the computing device with their own user accounts and associated data.

For example, a first user may run an email application on a computing device, which may prompt the first user to use a guest log-in function. The first user may enter a username and password for the user's umbrella account for an umbrella ecosystem that includes the first user's email account. The email application may initiate the creation of a restricted account using the account manager of the computing device. The restricted account may be created with access restrictions that allow only the email application to access the restricted account and a lifetime restriction that will cause the restricted account to be deleted or disabled (e.g., become suspended) once the first user exits or logs-off the email application. The email application may use the restricted account to access the first user's email account on the servers of the umbrella ecosystem. The first user may send, receive, view and manage their email using the email application. The first user's email account in the umbrella ecosystem may be updated to reflect the user's activity in the email application. When the user logs-off or exits the email application, the account manager may delete the restricted account from the computing device. A second user may then use email application on the computing device. The second user may be prompted to use the guest log-in function, as the first user's restricted account has been deleted and there may be no user account for the email application to use. The second user may thus be prevented from having access to the first user's email account. The second user may enter their username and password, have a restricted account created, and use the email application similarly to the first user, but with the second user's email account in the umbrella ecosystem.

An application may be used with a user account that the application developer or user may want to limit to being used only with the application. The user account may be a first umbrella account. The application may use the first umbrella account to make use of a specific service offered by the umbrella ecosystem, and the first umbrella account may have been created for use only with that specific service. The user or developer may not intend for the first umbrella account to be used with other services offered by the umbrella ecosystem. The user may have a second umbrella account, which the user may use with other services of the umbrella ecosystem. The first umbrella account may be created as a restricted account, either due to a setting in the application or a choice by the user, such that the first umbrella account can be used with the application and specific service of the umbrella ecosystem without being accessed by applications associated with other services of the umbrella ecosystem. The second umbrella account may be used on the same computing device as the first umbrella account with the applications associated with the other services of the application ecosystem. This may prevent the user from being presented with data from the first umbrella account in applications where the user would prefer to only be presented with data from the second umbrella account, while still having both umbrella accounts on the same computing device.

For example, an advertising management application may require an umbrella account which may be shared among a number of users. The developer of the advertising management application may indicate that any umbrella account created by or used with the advertising management application should be a restricted account with access restrictions limiting the restricted account to use with the advertising management application. The restricted account may be created on a computing device which already stores a user's personal umbrella account. The email application on the computing device may be able to access the user's personal umbrella account, which may be used to access the user's email account in the umbrella ecosystem. The restrictions on the restricted account may prevent the email application from accessing the umbrella account meant for use with the advertising management application, even though the umbrella account is for the same umbrella ecosystem as the user's personal umbrella account and includes an email account. This may prevent the email application from accessing and displaying email and other account information related to the restricted account alongside email and account information from the user's personal umbrella account. The user may use the advertising management application and email application on the same computing device without having the umbrella account needed for use with the advertising management application affect the user's usage of the email application. Other users may use the umbrella account for the advertising management application as a restricted account on their computing devices as well, without having data from the associated email account, shared by multiple users, show up in their email applications.

The username and password for the restricted account may be used to obtain a token that may be used as a credential by the restricted account. The token may incorporate any access restrictions from the restricted account, such that even if the token is leaked from the restricted account, the token would not function with any application that could not use the restricted account. The token may also be bound to the computing device on which the restricted account and associated token were created.

Restricted accounts may be stored with other user accounts in, for example, an account database on the computing device. When an application requests a list of user accounts, the account manager may send the application a list of the user accounts in the account database that have credentials that may be used by the application. The list of user accounts may include identifiers for restricted accounts which the requesting application is allowed to use based on each restricted account's access restrictions. An identifier on a list of user accounts may be used to inform an application of the existence of a user account, and allow the application to request data, such as credentials, from the user account. For example, an email application may request a list of user accounts. The list of user accounts sent to the email application may include identifiers for any user account in the account database that does not include an access restriction for the email application, and that does include credentials that may be used to access an email account compatible with the email application. This may prevent the email application from accessing user accounts that may include credentials that can be used to log-in to an email account, but which were not intended to be used to log-in to an email account, such as, for example, an umbrella account for use with an advertising management application or a device locator. Restricted accounts may be identified on the list of user accounts sent to an application only when the access restrictions on the restricted account allow it, for example, when the access restrictions whitelist the application or don't blacklist the application.

Multiple restricted accounts may be stored on a computing device, and a restricted account may be used with multiple applications on the computing device, as permitted by the access restrictions on the restricted accounts. For example, a computing device may store two restricted accounts for use with the same application or set of applications, and two applications on the computing device may use the same restricted account. The computing device may also have multiple restricted accounts, each of which may be used by a separate application.

Restricted accounts may be used to log-in across computing devices. A first computing device may store a user's umbrella account. The user may connect the first computing device to a second computing device, which may use the same mobile platform as the first computing device. The user may log-in to the second computing device with the first computing device using a restricted account created using the user's umbrella account from the first computing device. The restricted account may include a lifetime restriction that may cause an account manager on the second computing device to delete the restricted account when the first computing device disconnects or the user otherwise logs-off of the second computing device.

For example, a user may use a smartphone to connect to a smart television that uses the same mobile platform as the smartphone using any suitable network connection, such as a WiFi connection through a router, or direct device-to-device connection, such as a Bluetooth or direct WiFi connection. The user may log-in to the smart television using an application running on the smartphone that invokes an application on the smart television. The application on the smart television may receive the user's umbrella account from the smartphone, and may use the credentials from the umbrella account to create and store a restricted account with a lifetime restriction which may be used to the log-in the user's umbrella account on the smart television. The smart television may use the restricted account with any applications associated with the umbrella ecosystem, for example, accessing music and videos the user has stored in the umbrella ecosystem or using user preference data associated with the user's umbrella account to recommend content, such as movies, television shows, and music, to the user. When the user is done using the smart television, the user may disconnect the smartphone from the smart television, exit the application, use a log-off option in the application, or otherwise indicate to the smart television that the user wishes to log-off. The account manager running on the smart television may detect that the smartphone has disconnected or logged-off, and may delete the restricted account from the smart television's account database.

FIG. 1 shows an example system suitable for restricted accounts on a mobile platform according to an implementation of the disclosed subject matter. A computer 100 may include an account manager 110, an application 120, an application 130, and storage 140. The computer 100 may be any suitable device, such as, for example, a computer 20 as described in FIG. 8, for implementing the account manager 110, application 120, application 130, and the storage 140. The computer 100 may be a single computing device, or may include multiple connected computing devices, and may be, for example, a smartphone or tablet using a mobile platform that includes a mobile operating system. The storage 140 may include an account database 150, which may store user accounts for use on the computer 100. The user accounts may be user accounts with restrictions, such as restricted accounts 151 and 152, or user accounts without restrictions, such as accounts 155 and 157. The account manager 110 may manage the user accounts in the account database 150, for example, creating, editing, managing, and deleting the user accounts, and controlling access to the user accounts by applications, such as the applications 120 and 130, running on the computer 100. The storage 140 may store the account database 150 in any suitable format.

The account database 150 may store user accounts including the restricted accounts 151 and 153, and the accounts 155 and 157. The user accounts in the account database 150 may be created by the account manager using data from an application, such as the applications 120 and 130, on the computer 100, and input received from a user. For example, the account 155 may be the user's umbrella account for an umbrella ecosystem. The account 155 may include credentials, such as a username and password or tokens generated by the umbrella ecosystem, required to access the user's umbrella account. The account 155 may also include any other data pertaining to the user's umbrella account, such as sync setting for any applications associated with the umbrella ecosystem that are installed on the computer 100. The account 157 may be a second umbrella account for the umbrella ecosystem. For example, the account 155 may be a personal account, and the account 157 may be a business account or educational account, making use of the same umbrella ecosystem. The accounts 155 and 157 may be any other suitable user account types. For example, the account 155 and 157 may be user accounts for different umbrella ecosystems, or accounts for other network provided services such as, for example, social networking services, social media services, and business email services.

The restricted accounts 151 and 153 may be user accounts with restrictions. For example, the restricted account 151 may be an umbrella account for the umbrella ecosystem that includes restrictions, such as access restrictions and lifetime restrictions. The restricted account 153 may be an umbrella account for the umbrella ecosystem that may include the same credentials as the restricted account 151 with different restrictions, or may include different credentials used to access a different umbrella account. The restrictions on the restricted accounts 151 and 153 may be received by the account manager 110 from an application, such as the applications 120 and 130, which initiates the creation of the account, due to a setting in the application or input received from the user during the creation of the restricted account. For example, during the creation of the restricted account 151, the user may select to allow the restricted account 151 to only be accessed by the application 120. The restricted account 151 may not be accessible to the application 130. The application 120 may initiate the creation of the restricted account 153, and may include a setting indicating the restricted account 153 should have a lifetime restriction of three hours from the creation of the restricted account 153. The restricted account 153 may then be accessible to any application on the computer 100, including the application 130, but may be deleted from the account database 150 three hours after being created.

The account manager 110 may create, edit, manage, delete, and control access to the user accounts in the account database 150, including the restricted accounts 151 and 153 and the accounts 155 and 157. The account manager 110 may be any suitable component or API of the operating system included in the mobile platform used by the computer 100, or a separate application. To create a user account on the computer 100, an application may invoke the account manager 110. For example, the application 120 may be run on the computer 100. The application 120 may require a user account, for example, to access a server to retrieve and store data associated with the user of the computer 100. For example, the application 120 may be a game, and may require a user account to access saved game files or other game progress and configuration data stored for the user on a server remote from the computer 100. The application 120 may be an email application, and may require a user account to access the user's email account, which may be part of an umbrella ecosystem, so that the user can receive, send, and manage email. The application 120 may be an advertising management application, and may require a user account, which may be part of an umbrella ecosystem, to allow the user to manage the placement of advertisements on their behalf or the display of advertisements in, for example, applications developed by the user.

The applications 120 and 130 may be any suitable applications running on the computer 100. For example, the application 120 may be a game, productivity application, data providing application, or any application associated with an umbrella ecosystem and owned by the owner of the umbrella ecosystem or a third-party, such as an email application, a cloud storage application, a media sharing application, a mapping and navigation application, a media player application, a calendar application, an advertising management application, an electronic book reading application, a chat application, or an application management application. The applications 120 and 130 may initiate the creation of user accounts.

The application 120 may invoke the account manager 110 to create an appropriate user account and store the user account in the account database 150. The application 120 may provide the account manager 110 with any information suitable for the creation of the user account, such as identification information for the application. The user may be prompted, by the application 120 or the account manager 110, to enter credentials to access the user account. For example, the user may be prompted to enter a username and password to access an umbrella account, or to select a token or certificate that permit access to the umbrella account. The account manager 110 may store the credentials as part of the user account in the account database 150.

The account manager 110 may also receive restrictions on the user account. For example, the application 120 may include a setting indicating that any user account that the application 120 initiates the creation of may include a lifetime restriction. The lifetime restriction may also be received by the account manager 110 based on user input. The lifetime restriction may be a set amount of time, or may vary based on, for example, input from the user or the nature of the computer 100. The account manager 110 may receive the lifetime restriction from the application 120 and may store the user account in the account database 150 as, for example, the restricted account 151. For example, the application 120 may be an email application with a guest log-in function. Using the guest log-in function may initiate the creation of the restricted account 151 by the account manager 110, which may include credentials for accessing the user's email account in an umbrella ecosystem and a lifetime restriction causing the restricted account 151 to be deleted when the user exits or chooses to log-off from the application 120.

The application 120 may include a setting indicating that any user account the application 120 initiates the creation of may include access restrictions. The access restrictions may also be received by the account manager 110 based on user input. The account manager 110 may receive the access restrictions from the application 120 and store the user account in the account database 150, for example, as the restricted account 151. For example, the application 120 may be an advertising management application which may be part of an umbrella ecosystem and require the use of an umbrella account. The user of the umbrella account used with the advertising management application may not want to use the umbrella account with any other services of the umbrella ecosystem and their associated applications. For example, the user may not want an email application, for example, the application 130, on the computer 100 to access the email account associated with the umbrella account being used with the advertising management application. The advertising management application may include a setting restricting access to user accounts whose creation was initiated by the advertising management application to just the advertising management application. For example, the application 120 may indicate to the account manager 110 that the restricted account 151 may only be accessed by the application 120. The application 130, for example, the email application, may be unable to access the restricted account 151.

The account manager 110 may control access to the user accounts in the account database 150. For example, when the application 120 is run, the application may request a list of user accounts in the account database 150 from the account manager 110. The account manager 110 may provide the application 120 with a list of the user accounts in the application database 150, and may omit from the list of user accounts identifiers for any restricted account that the application 120 may not be allowed to access due to the access restrictions on the user account. The application 120 may use the list of user accounts to request credentials from the user accounts, for example, to sync data with a server of an umbrella ecosystem, or to present the user with a choice of accounts to be used with the application 120. For example, the application 120 may be an email application, and the user may be able to choose which of the user accounts the email application should use to access email.

The account manager 110 may delete user accounts from the account database 150. For example, the restricted account 153 may include a lifetime restriction of three hours from the creation of the restricted account 153. The account manager 110 may store the time the restricted account 153 was created with the restricted account 153, and may periodically check the age of the restricted account 153. When the account manager 110 determines that the restricted account 153 has reached the three hour lifetime limit, the account manager 110 may delete the restricted account 153 from the account database 150. The lifetime restriction may also tie the lifetime of the restricted account 153 to the occurrence of an event. For example, the lifetime of the restricted account 153 may be limited to the duration of the usage of the application 120 that initiated the creation of the account 153. The restricted account 153 may be deleted when the application 120 is exited or a logged-off from. The application 120 may invoke the account manager 110 upon exit or log-off, notifying the account manager 110 that the restricted account 153 may be deleted. The account manager 110 may also monitor the status of any application, such as the application 120, that created a restricted account, such as the restricted account 153, to determine when the application has been exited or logged-off and the restricted account may be deleted. The account manager 110 may also monitor or be notified of any other events that may require the deletion a restricted account due to a lifetime restriction.

Figure 2:
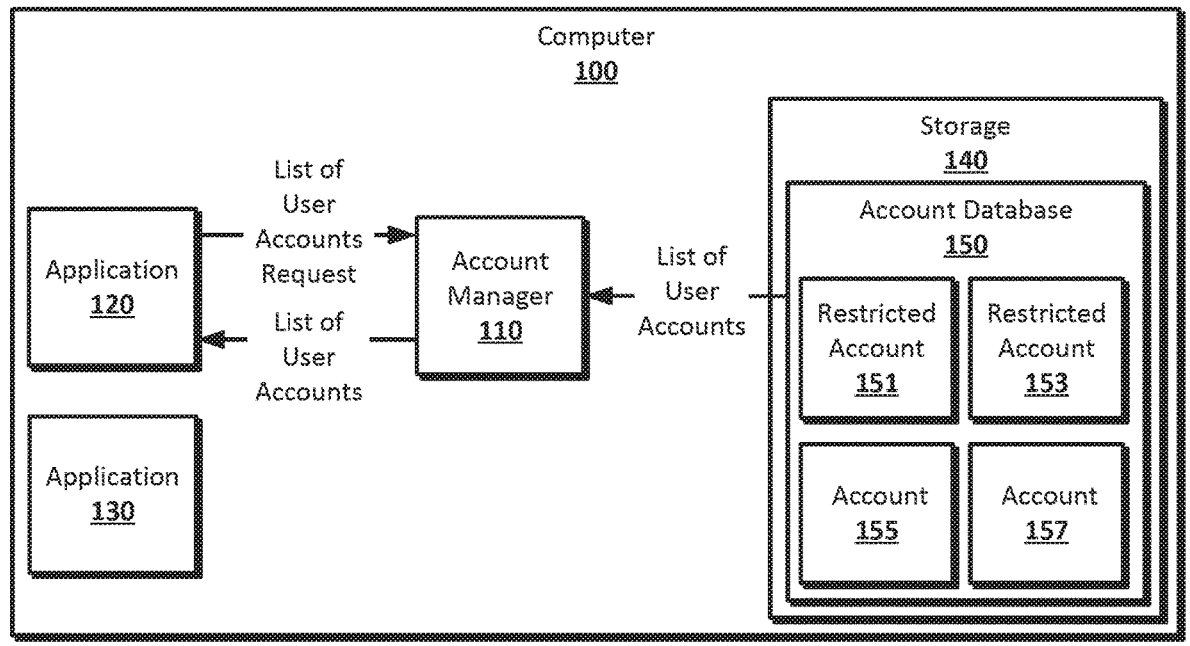
FIG. 2 shows an example arrangement for restricted accounts on a mobile platform according to an implementation of the disclosed subject matter.

FIG. 2 shows an example arrangement for restricted accounts on a mobile platform according to an implementation of the disclosed subject matter. The application 120 may be run on the computer 100. The application 120 may be, for example, a game, productivity application, media application, or other application associated with services provided by a computer remote to the computer 100 such as, for example, a server for an umbrella ecosystem. The application 120 may allow or require a user account and associated credentials for certain functionality. For example, an email application may require credentials from a user account to access an email server. The application 120 may request that the account manager 110 provide the application 120 with a list of user accounts from the account database 150 on the computer 100.

The account manager 110 may receive the request from the application 120, and may compile a list of user accounts to be provided to the application 120. The account manager 110 may include on the list of user accounts identifiers for any user account from the account database 150 that may be used by the application 120. For example, the application 120 may be an email application. The application 120 may be associated with the email service provided by the umbrella ecosystem and may be, for example, developed by the owner of the umbrella ecosystem or by a third-party to function with the email service of the umbrella ecosystem. The account 155 may have no restrictions and may include credentials for an umbrella account which may include an email account that can be accessed by the application 120. The account manager 110 may place an identifier for the account 155 on the list of user accounts to be sent to the application 120. The account 157 may have no restrictions, but may be a user account for a social networking site that does not provide an email service. The credentials of the account 157 may not be useful to the application 120, and the account manager 110 may leave an identifier for the account 157 off of the list of user accounts sent to the application 120. The restricted account 151 may include credentials for an umbrella account in the same umbrella ecosystem as the account 155, including access to an email account. The restricted account 151 may include an access restriction that prohibits the restricted account 151 from being accessed and used by the application 120. For example the restricted account 151 may be restricted for use only with the application 130, which may be an advertising management application. The account manager 110 may omit an identifier for the restricted account 151 from the list of user accounts sent to the application 120. The application 120 may thus be unaware of the existence of the restricted account 151, and may be unable to access the restricted account 151 and use the credentials to access the associated email account in the umbrella ecosystem. The restricted account 153 may include credentials for an umbrella account in the same umbrella ecosystem as the account 155, including access to an email account. The restricted account 153 may include a lifetime restriction limiting the life of the restricted account 153 to three hours. The account manager 110 may not have deleted the restricted account 153 from the account database 150 yet, as three hours may not have passed since the creation of the restricted account 153. The account manager 110 may include an identifier for the restricted account 153 on the list of user accounts sent to the application 120, which may use the credentials from the restricted account 153 until the lifetime limit has been reached and the account manager 110 deletes the restricted account 153.

The account manager 110 may thus provide an application requesting a list of accounts from the account database 150 with a list of user accounts that includes identifiers for only user accounts which have credentials the application can use and that the application is allowed to access based on access restrictions on the user accounts. Identifiers for any user account which an application is restricted from using may be omitted from the list of user accounts, and the application may not be aware of the existence of the omitted user accounts. This may prevent applications from attempting to access user accounts in contravention of the access restrictions. For example, the application 120 may be unaware of the existence of the restricted account 151 due to the omission of an identifier for the restricted account 151 from the list of user accounts sent to the application 120. The application 120 may have no way to ascertain that the restricted account 151 exists, preventing the application 120 from attempting to use the credentials of the restricted account 151.

Figure 3:
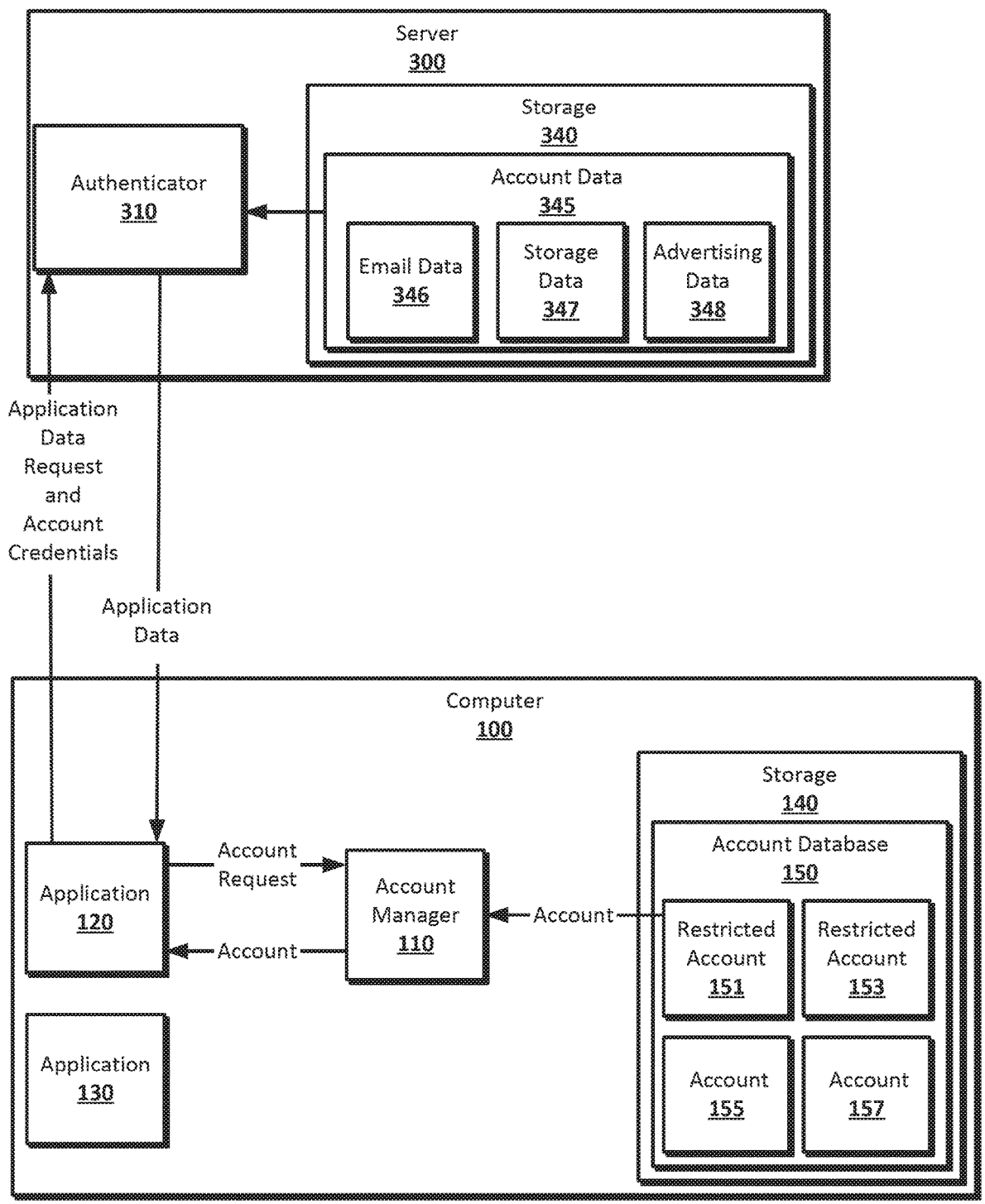
FIG. 3 shows an example arrangement for accessing a server with restricted accounts on a mobile platform according to an implementation of the disclosed subject matter.

FIG. 3 shows an example arrangement for accessing a server with restricted accounts on a mobile platform according to an implementation of the disclosed subject matter. A server 300 may include an authenticator 310 and storage 340, which may store account data 345. The account data 345 may include email data 346, storage data 347, and advertising data 348. The server 300 may be any suitable computing system for acting as a server. For example, the server 300 may be a server computer that is part of a server farm operated by the owner of an umbrella ecosystem. The authenticator 310 may be an application or process on the server 300 that may control access to the account data 345 in the storage 340 of the server 300. The account data 345 may be data associated with a user's umbrella account in the umbrella ecosystem. For example, the server 300 may provide email service, cloud storage, and advertising management services for an umbrella ecosystem. The email data 346 may be email and other email service related data, the storage data 347 may be stored files and other cloud storage service related data, and the advertising data 348 may be data related to the management of advertising purchases and revenue for a user's umbrella account in the umbrella ecosystem.

The application 120 on the computer 100 may attempt to access the account data 345 on the server 300. For example, the application 120 may be an advertising management application, and may be attempting to access the advertising data 348. In order to access the application data 345, the application 120 may need the credentials for the umbrella account whose data is stored in the account data 345. The credentials for the umbrella account may be stored on the computer 100 in the restricted account 151. The application 120 may be aware of the restricted account 151, as the restricted account 151 may not have an access restrictions for the application 120. The application 120 may request the credentials from the restricted account 151 from the account manager 110. The account manager 110 may provide the credentials from the restricted account 151 to the application 120, which may send the credentials to the authenticator 310 on the server 300 along with a request for the advertising data 348. The authenticator 310 may check the credentials to determine if the application 120 should be granted access to the account data 345. When the authenticator 310 has verified that the credentials are correct for the umbrella account to which the account data 345 belongs, the application 120 may be sent the advertising data 348.

The application 130 may be run on the computer 100, and may request a list of accounts from the account manager 110. The application 130 may be, for example, an email application. The restricted account 151 may include an access restriction limiting access to the restricted account 151 to the application 120. The list of user accounts received by the application 130 may not include an identifier for the restricted account 151. The application 130 may be unable to use the credentials from the account 151 to access the server 300, and may use a different user account, such as, for example, the account 155. The credentials for the account 155 may not permit access to the account data 345, as the account 155 may include credentials for a different umbrella account. For example, the application 130 may be unable to access the email data 346 from the server 300, preventing the application 130 from accessing the email for the umbrella account while the application 120 may still be able to access the advertising data 347 for the umbrella account. The umbrella account may be used with the application 120, the advertising management application, without having the account data 345 from the umbrella account accessed by other applications on the computer 100. This may, for example, prevent an umbrella account shared among a number of users on a number of computing devices and used for advertising management from cluttering other umbrella ecosystem applications with data from the shared umbrella account. It may then be easier to use the shared umbrella account on a computing device in conjunction with a personal or business umbrella account.

Figures 4, 5, 6:
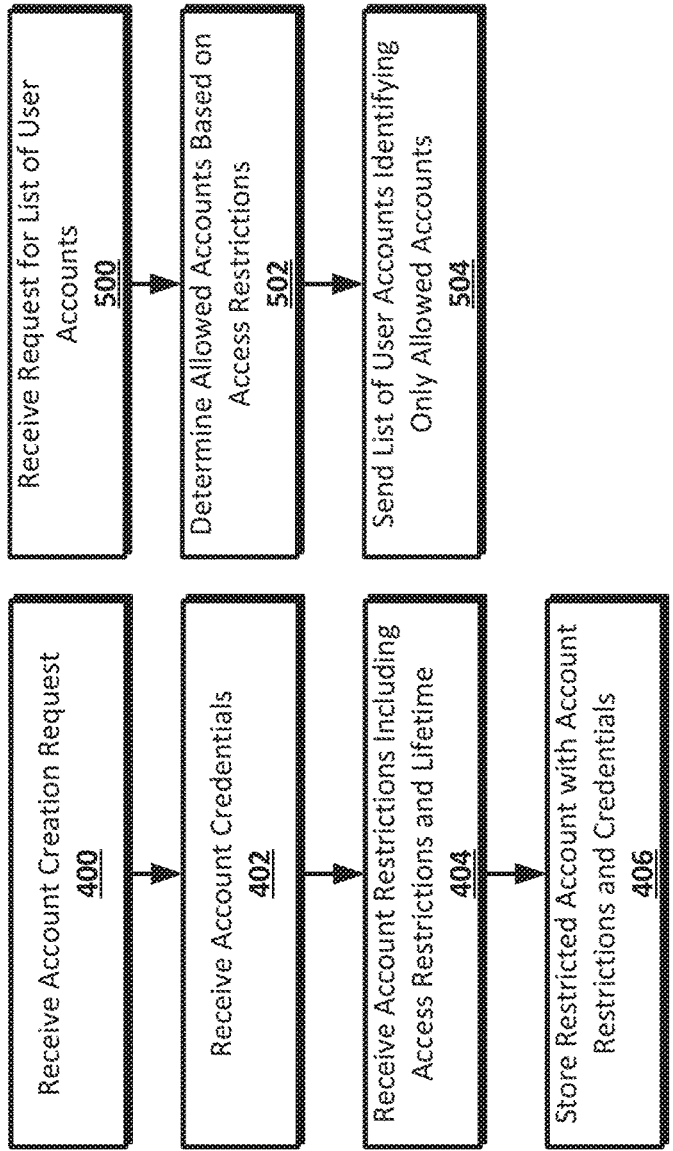
FIG. 4 shows an example of a process for creating a restricted account on a mobile platform according to an implementation of the disclosed subject matter.
FIG. 5 shows an example of a process for generating a list of user accounts with restricted accounts on a mobile platform according to an implementation of the disclosed subject matter.
FIG. 6 shows an example of a process for deleting an restricted account on a mobile platform according to an implementation of the disclosed subject matter.

FIG. 4 shows an example of a process for creating a restricted account on a mobile platform according to an implementation of the disclosed subject matter. At 400, an account creation request may be received. For example, the account manager 110 may receive a request from the application 120 to create a user account, for example, the restricted account 151. The application 120 may send the request when, for example, the application 120 is run for the first time on the computer 100, any user accounts used previously by the application 120 have been deleted, the user selects a guest log-in option in the application 120, or the user otherwise indicates that the creation of a new user account should be initiated by the application.

At 402, account credentials may be received. For example, the account manager 110 may receive credentials, such as a username and password, to be stored in the restricted account 151. The credentials may be received from the application 120, or may be entered by a user directly into the account manager 110. For example, the account manager 110 may prompt the user to enter a username and password. The credentials may allow access to services or data used by the application 120. For example, the username and password entered by the user for the restricted account 151 may be used to access an umbrella account in an umbrella ecosystem, including, for example, account data 345 on the server 300.

At 404, account restrictions, including access restrictions and lifetime restrictions, may be received. For example, the account manager 110 may receive access restrictions for the restricted account 151 from the application 120 based on a setting in the application 120 or user input to the application 120. The account manager 110 may also receive restrictions based on user input to the account manager 110. The restrictions received by the account manager 110 may be access restrictions, for example, limiting the restricted account 151 for use only with the application 120, or lifetime restrictions, for example, limiting the life of the restricted account 151 to a number of hours.

At 406, the restricted account may be stored with the account restrictions and the credentials. For example, the account manager 110 may store the restricted account 151, with the credentials and account restrictions, in the account database 150, alongside accounts that do not have restrictions such as the accounts 155 and 157. The restricted account 151 may be stored in any suitable format, for example, with the password hashed or otherwise encrypted. The username and password may also be used to obtain a token, for example, from the authenticator 310, which may be stored in the restricted account 151 and used in place of the username of password.

FIG. 5 shows an example of a process for generating a list of user accounts with restricted accounts on a mobile platform according to an implementation of the disclosed subject matter. At 500, a request for a list of user accounts may be received. For example, the account manager 110 may receive a request from the application 120 for a list of user accounts in the accounts in the account database 150 with credentials that can be used by the application 120. The application 120 may be an email application, and may request a list of accounts from the account database 150 that with credentials that can be used to access an email account compatible with the application 120.

At 502, access restrictions on the user accounts may be used to determine user accounts that the application is allowed to use. For example, the account manager 110 may check for any access restrictions on the user accounts in the account database 150 before placing identifiers for the user accounts on the list of user accounts to be sent to the application 120. The restricted account 151 may include an access restriction for the application 130, but not for the application 120, so the account manager 110 may include an identifier for the restricted account 151 on the list of user accounts sent to the application 120. The restricted account 153 may include an access restriction for the application 120, so the account manager 110 may omit an identifier for the restricted account 153 from the list of user accounts sent to the application 120, and the application 120 may be unaware of the existence of the restricted account 153. This may prevent the application 120 from circumventing the access restrictions on the restricted account 153, preventing the application 120 from using the credentials of the restricted account 153.

At 504, the list of user accounts may be sent to the application. For example, the account manager 110 may send the list of user accounts to the application 120. The list of user accounts may include only user accounts from the account database 150 that the application 120 is allowed to access based on the access restrictions on the user accounts. For example, the account manager 110 may send the application 120 a list of user accounts that may include identifiers for the restricted account 151, the account 155, and the account 157, and may not include identifiers for the restricted account 153, which the application 120 may not be allowed to access.

FIG. 6 shows an example of a process for deleting a restricted account on a mobile platform according to an implementation of the disclosed subject matter. At 600, the age of a restricted account may be determined. For example, the account manager 110 may compare the current time to the time at which the restricted account 151 was created in the account database 150. The restricted account 151 may have been created at 6:00 pm and the current time may be 9:00 pm. The restricted account 151 may be three hours old.

At 602, the age of the restricted account may be compared to the lifetime of the restricted account. For example, the account manager 110 may compare the age of the restricted account 151, which may be three hours, to the lifetime specified in a lifetime restriction for the restricted account 151, which may be three hours. The account manager 110 may determine whether the age of the restricted account 151 equals or exceeds the lifetime of the restricted account 151.

At 604, the restricted account may be deleted when the age of the restricted account equals or exceeds the lifetime of the restricted account. For example, the age of the restricted account 151 may be three hours, equaling the lifetime of the restricted account 151. The account manager 110 may delete the restricted account 151 from the account database 150.

Figure 7:
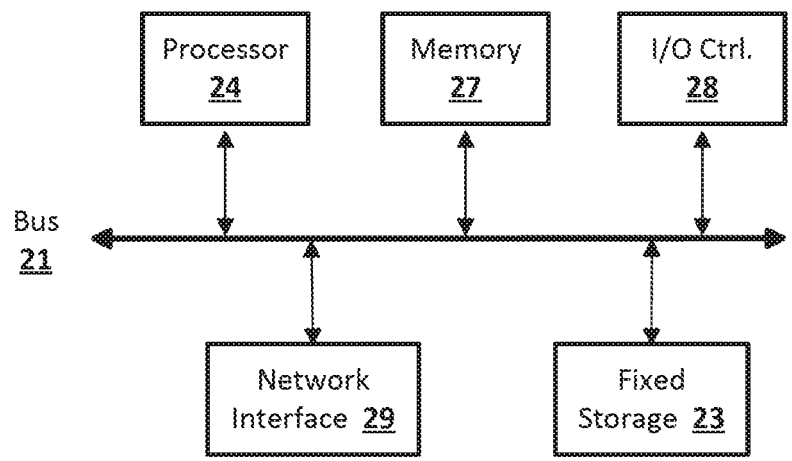
FIG. 7 shows a computer according to an embodiment of the disclosed subject matter.

Embodiments of the presently disclosed subject matter may be implemented in and used with a variety of component and network architectures. FIG. 7 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 8.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 8:
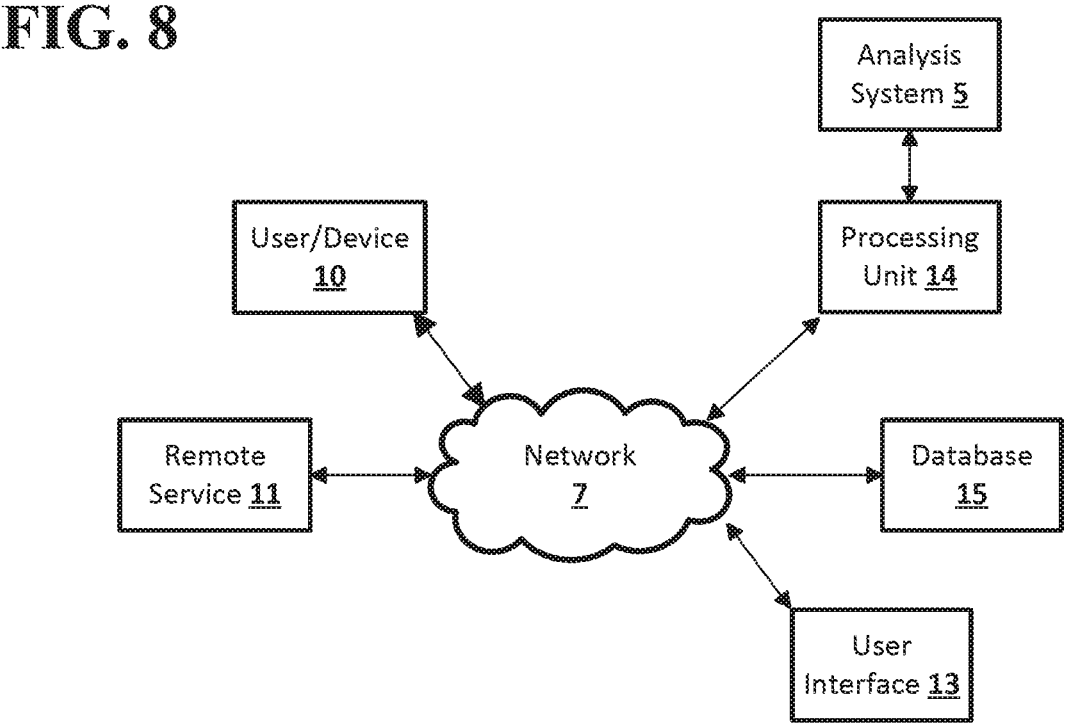
FIG. 8 shows a network configuration according to an embodiment of the disclosed subject matter.

FIG. 8 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, by way of a user interface operable by a second user, a request to initiate a logged-in session (i) on a computing device associated with a first user and (ii) using a restricted account, wherein the restricted account is associated with the second user and has at least one lifetime restriction that limits a lifetime of the logged-in session by causing deletion of the restricted account from the computing device in response to (i) exceeding a time limit on the lifetime of the logged-in session or (ii) an event whose occurrence ends the lifetime of the logged-in session;
   receiving log-in credentials for the restricted account, wherein the log-in credentials allow access to one or more of services or data, and wherein the log-in credentials are obtained by way of the user interface, wherein the user interface is (i) presented as part of a log-in function and (ii) configured to allow for specification of a plurality of different lifetime restrictions, and wherein the plurality of different lifetime restrictions comprises at least one of (i) the time limit or (ii) the event;
   receiving the at least one lifetime restriction of the plurality of different lifetime restrictions for the logged-in session, wherein the at least one lifetime restriction is specified by way of the user interface presented as part of the log-in function;
   creating the logged-in session using the restricted account, wherein the restricted account comprises the log-in credentials and the at least one lifetime restriction for the logged-in session;
   storing the restricted account in a storage device of the computing device to represent the logged-in session; and
   deleting the restricted account from the storage device in response to the at least one lifetime restriction being met, wherein deleting the restricted account from the storage device terminates the logged-in session to prevent the first user from using the logged-in session of the second user on the computing device.

2. The computer-implemented method of claim 1, wherein the at least one lifetime restriction for the logged-in session comprises the time limit on the lifetime of the logged-in session, and wherein deleting the restricted account from the storage device in response to the at least one lifetime restriction being met comprises:
   determining an age of the restricted account stored in the storage device;
   comparing the age of the restricted account stored in the storage device to the time limit on the lifetime of the logged-in session; and
   deleting the restricted account when the age of the restricted account stored in the storage device is equal to or greater than the time limit on the lifetime of the logged-in session.

3. The computer-implemented method of claim 1, wherein the at least one lifetime restriction comprises an indication of the event whose occurrence ends the lifetime of the logged-in session, and wherein deleting the restricted account from the storage device in response to the at least one lifetime restriction being met comprises:

determining that the event indicated by the at least one lifetime restriction has occurred; and deleting the restricted account from the storage device.

4. The computer-implemented method of claim 1, wherein the restricted account comprises an account in an umbrella ecosystem.

5. The computer-implemented method of claim 1, wherein the log-in credentials comprise at least one of: a username and password, an email address and password, or a token.

6. The computer-implemented method of claim 1, wherein storing the restricted account further comprises storing the restricted account in an account database in the storage device, and wherein the account database additionally stores at least one user account that is not restricted.

7. The computer-implemented method of claim 1, wherein the request to initiate the logged-in session is received from an application on the computing device, and wherein the at least one lifetime restriction is received from the application.

8. The computer-implemented method of claim 1, wherein the log-in credentials and the at least one lifetime restriction are received using a network connection or a direct device-to-device connection.

9. The computer-implemented method of claim 1, wherein the request to initiate the logged-in session is received from an application based on user selection of a guest log-in for the application.

10. A computer-implemented system for restricted accounts comprising:

a storage device comprising an account database; and a hardware processing device adapted to:

receive, from a first application on a computing device associated with a first user, a request to initiate a logged-in session using a restricted account associated with a second user, wherein the request is obtained by way of a user interface operable by the second user;

receive log-in credentials for the restricted account, wherein the log-in credentials allow access to one or more of services or data, wherein the log-in credentials are obtained by way of the user interface, wherein the user interface is (i) presented as part of a log-in function and (ii) configured to allow for specification of a plurality of different lifetime restrictions, wherein the plurality of different lifetime restrictions comprises at least one of (i) a time limit on a lifetime of the logged-in session or (ii) an event whose occurrence ends the lifetime of the logged-in session;

receive at least one lifetime restriction of the plurality of different lifetime restrictions for the logged-in session, wherein the at least one lifetime restriction limits the lifetime of the logged-in session by deleting the restricted account in response to (i) exceeding the time limit on the lifetime of the logged-in session or (ii) the event whose occurrence ends the lifetime of the logged-in session, wherein the at least one lifetime restriction is specified by way of the user interface presented as part of the log-in function;

create a logged-in session using the restricted account and store the restricted account with the log-in credentials and the at least one lifetime restriction in the account database of the storage device to represent the logged-in session; and delete the restricted account from the account database in response to the at least one lifetime restriction being met, wherein deleting the restricted account from the account database terminates the logged-in session to prevent the first user from using the logged-in session of the second user on the computing device.

11. The computer-implemented system of claim 10, wherein the hardware processing device is adapted to delete the restricted account from the account database in response to the at least one lifetime restriction being met by:

when the at least one lifetime restriction for the logged-in session comprises the time limit on the lifetime of the logged-in session, determining an age of the restricted account stored in the account database, and deleting the restricted account from the account database when the age of the restricted account is equal to or greater than the time limit on the lifetime of the logged-in session.

12. The computer-implemented system of claim 10, wherein the hardware processing device is adapted to delete the restricted account from the account database in response to the at least one lifetime restriction being met by:

when the at least one lifetime restriction comprises an indication of the event whose occurrence ends the lifetime of the logged-in session, determining the occurrence of the event indicated by the at least one lifetime restriction, and deleting the restricted account from the account database when the event indicated by the at least one lifetime restriction has occurred.

13. The computer-implemented system of claim 10, wherein the hardware processing device is further adapted to (i) receive a request for the log-in credentials for the restricted account from a second application and (ii) send the log-in credentials of the restricted account to the second application.

14. The computer-implemented system of claim 10, wherein the hardware processing device is further adapted to receive the request to initiate the logged-in session from the computing device, wherein the computing device is communicatively connected to the hardware processing device.

15. The computer-implemented system of claim 10, wherein the event is one or more of: a specified application has stopped running, selection of a log-off option in the specified application, or a connection with a computing device has ended.

16. The computer-implemented system of claim 10, wherein the account database further stores at least one user account without restrictions.

17. The computer-implemented system of claim 10, wherein the log-in credentials comprise at least one of: a username and password, an email address and password, or a token.

18. A system comprising one or more computers and one or more storage devices storing instructions which are operable, when executed by the one or more computers, to cause the one or more computers to perform operations comprising:

receiving, by way of a user interface operable by a second user, a request to initiate a logged-in session (i) on a computing device associated with a first user and (ii) using a restricted account, wherein the restricted account is associated with the second user and has at least one lifetime restriction that limits a lifetime of the logged-in session by causing deletion of the restricted account from the computing device in response to (i)

exceeding a time limit on the lifetime of the logged-in session or (ii) an event whose occurrence ends the lifetime of the logged-in session;

receiving log-in credentials for the restricted account, wherein the log-in credentials allow access to one or more of services or data, and wherein the log-in credentials are obtained by way of the user interface, wherein the user interface is (i) presented as part of a log-in function and (ii) configured to allow for specification of a plurality of different lifetime restrictions, and wherein the plurality of different lifetime restrictions comprises at least one of (i) the time limit or (ii) the event;

receiving the at least one lifetime restriction of the plurality of different lifetime restrictions for the logged-in session, wherein the at least one lifetime restriction is specified by way of the user interface presented as part of the log-in function;

creating the logged-in session using the restricted account, wherein the restricted account comprises the log-in credentials and the at least one lifetime restriction for the logged-in session;

storing the restricted account in a storage device of the computing device to represent the logged-in session; and deleting the restricted account from the storage device of the computing device in response to the at least one lifetime restriction being met, wherein deleting the restricted account from the storage device terminates the logged-in session to prevent the first user from using the logged-in session of the second user on the computing device.

19. The system of claim 18, wherein the at least one lifetime restriction for the logged-in session comprises the time limit on the lifetime of the logged-in session, and wherein deleting the restricted account from the storage device of the computing device in response to the at least one lifetime restriction being met comprises:

determining an age of the restricted account stored in the storage device;

comparing the age of the restricted account stored in the storage device of the computing device to the time limit on the lifetime of the logged-in session; and deleting the restricted account when the age of the restricted account stored in the storage device of the computing device is equal to or greater than the time limit on the lifetime of the logged-in session.

20. The system of claim 18, wherein the at least one lifetime restriction comprises an indication of the event whose occurrence ends the lifetime of the logged-in session, and wherein deleting the restricted account from the storage device of the computing device in response to the at least one lifetime restriction being met comprises:

determining that the event indicated by the at least one lifetime restriction has occurred; and deleting the restricted account from the storage device of the computing device.

* * * * *